United States Patent [19]

Brunelle et al.

[11] Patent Number: 6,084,055
[45] Date of Patent: Jul. 4, 2000

[54] METHOD FOR PREPARING POLY(1,4-CYCLOHEXANE DICARBOXYLATES)

[75] Inventors: Daniel Joseph Brunelle, Burnt Hills; Taeseok Jang, Troy, both of N.Y.

[73] Assignee: General Electric Company, Schenectady, N.Y.

[21] Appl. No.: 09/281,529

[22] Filed: Mar. 30, 1999

[51] Int. Cl.⁷ .................................................. C08G 63/02
[52] U.S. Cl. ........................................... 528/272; 528/271
[58] Field of Search ...................... 528/271, 272

[56] References Cited

U.S. PATENT DOCUMENTS

| | | | |
|---|---|---|---|
| 2,901,466 | 8/1959 | Kibler et al. ............................ | 528/176 |
| 4,003,883 | 1/1977 | Fagerburg et al. ..................... | 528/176 |
| 5,646,236 | 7/1997 | Schafheutle et al. .................. | 528/288 |
| 5,723,562 | 3/1998 | Stein ...................................... | 528/44 |

*Primary Examiner*—Terressa Mosley-Boykin
*Attorney, Agent, or Firm*—Sterling B. Brown; Noreen C. Johnson

[57] ABSTRACT

Polyesters such as poly(1,4-cyclohexanedimethyl-1,4-cyclohexanedicarboxylate) are prepared by the reaction of at least one relatively non-volatile diol, preferably 1,4-cyclohexanedimethanol, with a 1,4-cyclohexanedicarboxylic acid ester in the presence of a catalyst such as a tetraalkyl titanate. Maximum molecular weight and crystallinity are provided by at least one of two options: conducting the reaction at a series of progressively increasing temperatures below 265° C., with a residence time in the range of 40–120 minutes at temperatures above 250° C.; and conducting an initial stage of the reaction in the presence of at least one $C_{2-6}$ aliphatic diol such as ethylene glycol, diethylene glycol or 1,4-butanediol.

37 Claims, No Drawings

METHOD FOR PREPARING POLY(1,4-CYCLOHEXANEDICARBOXYLATES)

BACKGROUND OF THE INVENTION

This invention relates to the preparation of polyesters, and more particularly to the preparation of poly(1,4-cyclohexanedicarboxylates).

Poly(1,4-cyclohexanedicarboxylates) such as poly(1,4-cyclohexanedimethyl-1,4-cyclohexanedicarboxylate), hereinafter sometimes designated "PCCD" for brevity, are known polyesters; reference is made, for example, to U.S. Pat. No. 2,891,930. PCCD is characterized by such advantageous properties as crystallinity and resistance to weathering under conditions of exposure to ultraviolet radiation. These properties have increased interest in commercialization in recent years.

However, the crystallinity of PCCD is not as high as that of such commercially available polyesters as poly(1,4-butylene terephthalate), or "PBT". While the crystalline melting temperature, Tm, of PCCD is in the range of 220–235° C., a relatively high figure, its temperature of crystallization from the melt, Tc, is frequently on the order of 152–171° C. Therefore, it crystallizes only slowly and its solvent resistance is not as high as might be desired. Experience has shown that rapid crystallization is exhibited by polymers having a minimum value of the parameter Tm–Tc (i.e., Tm minus Tc).

In the preparation of such polyesters as PBT from glycols and dialkyl terephthalates such as dimethyl terephthalate, it is customary to employ a stoichiometric excess of the volatile glycol (e.g., ethylene glycol or 1,4-butanediol) on the order of 20–50% and remove the excess by distillation after a first oligomerization or "pre-condensation" step, proceeding then to an "ester interchange" step of molecular weight building. This is, however, not possible in PCCD preparation since the diol employed, 1,4-cyclohexanedimethanol (hereinafter sometimes "CHDM"), is relatively non-volatile (boiling point ≈283° C.). Instead, it has been necessary to utilize a one-step process for the reaction of CHDM with 1,4-cyclohexanedicarboxylic acid esters such as the dimethyl ester (hereinafter sometimes "DMCD") and exercise tight control of stoichiometry to produce a high molecular weight product (most often a weight average molecular weight, Mw, of 70,000 or greater). For example, DMCD is typically employed in about a 0.5 mole percent excess. This requires the imposition of strict limitations on the process conditions.

Various factors have been found to affect the crystallinity of the product. They include its isomeric state and the isomeric states of the reagents, and the tendency of crosslinking and/or branching reactions to occur during polymerization.

The proportion of trans isomer in DMCD as typically supplied is on the order of 99%. During the PCCD-forming reaction, isomerization can take place with an increase in the level of the cis isomer, decreasing crystallinity. The CHDM reagent is normally about 70% trans, but no isomerization of those molecules takes place during product formation.

Also, it has been observed that some degree of gel formation occurs during polymerization, decreasing the value of Tc and thus the crystallinity level. This is apparently the result of crosslinking-branching reactions.

It would be desirable to develop a preparation method for poly(1,4-cyclohexanedicarboxylates) which is not as subject to process limitations and can nevertheless produce a high molecular weight polymer. It would also be desirable to produce polymers which crystallize rapidly from the melt.

SUMMARY OF THE INVENTION

The present invention provides various improvements in the process for preparation of poly(1,4-cyclohexanedicarboxylates). These improvements may be employed individually or in various combinations, and when so employed make it possible to produce a rapidly crystallizing polymer and/or a polymer of high molecular weight.

According to the invention, poly(1,4-cyclohexanedicarboxylates) are prepared by the reaction of at least one relatively non-volatile diol with a 1,4-cyclohexanedicarboxylic acid ester in the presence of a transesterification catalyst, employing at least one of the following options:

(I) conducting said reaction at a series of progressively increasing temperatures below 265° C., with a residence time in the range of 40–120 minutes at temperatures above 250° C.;

(II) conducting an initial stage of said reaction in the presence of at least one $C_{2-6}$ aliphatic diol in the amount of about 3–25 mole percent based on said 1,4-cyclohexanedicarboxylic acid ester.

DETAILED DESCRIPTION; PREFERRED EMBODIMENTS

The polyesters produced by the method of this invention are 1,4-cyclohexanedicarboxylates, characterized by the presence of structural units of the formula

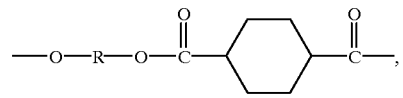

wherein R is an alkyl radical derived primarily from at least one relatively non-volatile diol HO—R—OH. It is most often a homopolyester, but as noted hereinafter, it may also be a copolyester or a copolyesteramide.

The 1,4-cyclohexanedicarboxylic acid esters employed in the method of this invention are known compounds. Suitable 1,4-cyclohexanedicarboxylic acid esters include, but are not limited to, $C_{1-6}$ alkyl esters, aromatic esters, and substituted aromatic esters, particularly alkyl-substituted aromatic esters. Alkyl-substituted aromatic groups within the context of the present invention refer to aromatic groups bearing at least one $C_{1-6}$ alkyl substituent. Preferred aromatic groups are phenyl, tolyl, xylyl, and trimethylphenyl. Particularly preferred 1,4-cyclohexanedicarboxylic acid esters are phenyl esters and $C_{1-6}$ alkyl esters. In an especially preferred embodiment the ester is dimethyl-1,4-cyclohexanedicarboxylate (DMCD).

In one embodiment of the invention DMCD undergoes a transesterification reaction with at least one relatively non-volatile diol. Within the context of the present invention "relatively non-volatile" diols are those having a boiling point (at atmospheric pressure) above the initial condensation temperature of a series of progressively increasing temperatures below 265° C. under which conditions the transesterification reaction of the present invention is performed. Preferably, the relatively non-volatile diol or mixture of relatively non-volatile diols has a boiling point above about 220° C., more preferably above about 240° C., and most preferably above about 260° C. In especially preferred embodiments the relatively non-volatile diol or mixture of relatively non-volatile diols has a boiling point at atmospheric pressure of above about 250° C. Suitable diols are known in the art and include CHDM. For the sake of convenience, the invention will frequently be described herein with reference to CHDM as the diol; however, it should be understood that other relatively non-volatile diols may be substituted for CHDM or combined with CHDM as appropriate.

The transesterification reaction is conducted in the presence of a suitable catalyst. Suitable catalysts for transesterification are well-known in the art and include organometallic compounds containing at least one metal selected from the group consisting of titanium, zirconium, tin, germanium, gallium, zinc, iron, manganese, cobalt, hafnium, vanadium, iridium, lanthanum, cerium, lithium, calcium, magnesium, barium, nickel, and aluminum. Only one kind of the above-listed catalysts may be employed, or two or more kinds thereof may be suitably mixed and employed. In preferred embodiments the catalyst is a tetraalkyl titanate such as tetraisopropyl titanate, hereinafter sometimes "TPT". Proportions thereof are in the range of about 0.005–0.5 and more preferably in the range of about 0.02–0.12 mole percent based on 1,4-cyclohexanedicarboxylic acid ester. It may, on occasion, be advantageous to introduce the catalyst in stages, with up to about 50% thereof being present at the initiation of the transesterification reaction and the balance being added subsequently, most often after about 30–50% of the total reaction time. The catalyst may be introduced into the reaction mixture by any means known in the art. Often it is convenient to add the catalyst either neat or as a solution in an inert solvent.

Solvents and diluents are not necessary according to the invention and are preferably not present other than in trace amounts. Subatmospheric reaction pressures may be employed.

It is within the scope of the invention for the poly(1,4-cyclohexanedicarboxylate) to be a copolyester of a type incorporating "soft-blocks" derived from polyethers. This may be done by incorporating in the transesterification reaction mixture at least one relatively non-volatile bis (hydroxy-terminated) polyether such as, but not limited to, poly(ethylene glycol), poly(propylene glycol), poly (butylene glycol) and their copolymers such as bis(hydroxy-terminated) poly(ethylene oxide-co-propylene oxide). In especially preferred embodiments the copolyester consists essentially of diol units derived from 1,4-cyclohexanedimethanol and diol units derived from at least one relatively non-volatile bis(hydroxy-terminated) polyether.

It is further within the scope of the invention for the poly(1,4-cyclohexanedicarboxylate) to be a copolyesteramide of a type incorporating "soft-blocks" derived from relatively non-volatile bis(amine-terminated) polyethers. This may be done by incorporating in the transesterification reaction mixture at least one bis(amine-terminated)-polyalkylene oxide, such as, but not limited to, bis(amine-terminated)-polyethylene oxide, -polypropylene oxide, -polybutylene oxide, and their copolymers such as bis (amine-terminated) poly(ethylene oxide-co-propylene oxide). In especially preferred embodiments the copolyesteramide consists essentially of diol units derived from 1,4-cyclohexanedimethanol and diamine units derived from at least one relatively non-volatile bis(amine-terminated) polyether.

Because of the possible thermal instability of bis (hydroxy-terminated)- or bis(amine-terminated)-polyethers, it is often advantageous to incorporate at least one thermal stabilizer into the reaction mixture containing at least one of said polyethers. Preferred thermal stabilizers are non-reactive stabilizers including those which will not themselves undergo transesterification with the poly(1,4-cyclohexanedi-carboxylate) product. Especially preferred thermal stabilizers include 1,3,5-trimethyl-2,4,6-tris(3,5-di-tert-butyl-4-hydroxybenzyl)benzene. A sufficient amount of stabilizer is used to prevent significant degradation of said polyether and polyether-containing copolyester under the reaction conditions. Preferably 0.1–2.0 wt. % stabilizer and more preferably 0.2–1.0 wt. % stabilizer based on polyether is employed.

It is still further within the scope of the invention for the poly(1,4-cyclohexanedicarboxylate) to be a copolyesteramide of the type disclosed in copending, commonly owned application Ser. No. 09/075,914. This may be done by incorporating in the transesterification reaction mixture at least one non-polyether-containing diamine such as hexamethylenediamine or a bisesteramide derived therefrom, such as hexamethylenebis(4-carbomethoxy-cyclohexylcarboxamide).

In option I of the method of the invention, the reaction of at least one relatively non-volatile diol with 1,4-cyclohexanedi-carboxylic acid ester is conducted at a series of progressively increasing temperatures, normally starting in the range of about 150–160° C. and increasing over the course of the reaction to a maximum level. The molar ratio of 1,4-cyclohexanedicarboxylic acid ester to relatively non-volatile diol or mixture of relatively non-volatile diols is most often in the range of about 1.001–1.01:1. A diol volatile under the transesterification reaction conditions is evolved during the transesterification between relatively non-volatile diol or mixture of relatively non-volatile diols with 1,4-cyclohexanedicarboxylic acid ester. Said volatile diol is removed under the reaction conditions to drive the transesterification equilibrium to polymer. For example, when the 1,4-cyclohexanedicarboxylic acid ester is DMCD, methanol is evolved during the reaction with the at least one relatively non-volatile diol, and the methanol is removed by distillation to facilitate formation of poly(1,4-cyclohexanedicarboxylate).

It has been found that the maximum temperature should be below 265° C. for optimum molecular weight increase. Preferably, the maximum temperature is 255° C.; most preferably, it is 253° C. A residence time of the reaction mixture at temperatures above 250° C. is maintained in the range of 40–120 minutes, and more preferably in the range of 80–120 minutes. The optimum residence time range of the reaction mixture at temperatures above 250° C. will depend on factors including the surface-to-volume ratio of the reaction equipment and the rate of surface renewal in said equipment. By employing the specified temperatures, it is possible to obtain a product of maximum Mw, typically above 70,000, and with a high degree of crystallinity and capability of rapid crystallization, as evidenced by a Tc frequently above 175° C.

According to option II, the initial stage of the transesterification reaction is conducted in the presence of at least one $C_{2-6}$ aliphatic diol. Suitable $C_{2-6}$ aliphatic diols are those which have a boiling point at atmospheric pressure less than the boiling point at atmospheric pressure of the relatively non-volatile diol or mixture of relatively non-volatile diols. Preferred $C_{2-6}$ aliphatic diols include ethylene glycol, diethylene glycol, neopentylene glycol, and 1,4-butanediol. The $C_{2-6}$ aliphatic diol is normally introduced at the beginning of the reaction.

When option II is employed, the molar ratio of the relatively non-volatile diol or mixture of relatively non-volatile diols to 1,4-cyclohexanedicarboxylic acid ester may be somewhat higher than otherwise; for example, in the range of about 1.025–1.15:1. The $C_{2-6}$ aliphatic diol is present in the amount of about 3–25 and preferably about 5–20 mole percent, based on 1,4-cyclohexanedicarboxylic acid ester.

One effect of option II appears to be to convert the transesterification reaction from a simple one-step process to one more closely resembling the two-step process characteristic of the production of such polyesters as poly(1,4-butylene terephthalate). Thus, in the early stages of the reaction the aliphatic diol apparently participates actively, to form an aliphatic diol-terminated oligomer which, in later stages, polycondenses with elimination of the more volatile diol to form high molecular weight poly(1,4-cyclohexanedicarboxylate).

Although the major portion of the $C_{2-6}$ aliphatic diol is eliminated from the reaction mixture, it is often found that a small portion of the $C_{2-6}$ aliphatic diol remains in the final polymer product. Thus, when option II is employed, often about 0.5–5 mole % of the diol-derived units in the poly(1,4-cyclohexanedicarboxylate) may be derived from $C_{2-6}$ aliphatic diol and the remaining 95–99.5 mole % of the diol-derived units are derived from the relatively non-volatile diol or mixture of relatively non-volatile diols. The final proportion of $C_{2-6}$ aliphatic diol-derived units in the polymer product will be dependent upon the actual process conditions among other factors. Using option II, it is also within the bounds of the present invention to prepare a poly(1,4-cyclohexane-dicarboxylate) with diol-derived units consisting essentially of relatively non-volatile diol or mixture of relatively non-volatile diols. Furthermore, using option II, it is also within the bounds of the present invention to prepare a poly(1,4-cyclohexanedicarboxylate) with diol-derived units consisting of relatively non-volatile diol or mixture of relatively non-volatile diols.

The invention is illustrated by the following, non-limiting examples. All parts are by weight unless otherwise designated. Mw values were determined by gel permeation chromatography. Differential scanning calorimetry (DSC) values for Tm and Tc were determined on polymer samples using information from the second heat.

EXAMPLES 1–3 (Option I)

Various proportions of DMCD and CHDM (each present in about 1 mole quantity) were weighed into a glass tube reactor which was placed in a melt polymerization apparatus equipped with a stirrer, temperature programmer, temperature sensing means, vacuum controller and torque meter. The pressure was reduced to 500 torr, the mixtures were heated to 160° C. in a sand bath and portions of tetraisopropyl titanate catalyst were added. Programmed heating, with stirring at 150 rpm, was then initiated as follows:

160–180° C., 60 minutes;
180–230° C., 20 minutes;
230–253° C., 120 minutes (100 minutes at 253° C.).

The pressure was reduced to 1 torr in the 180–230° C. period. In Examples 2–3, a second portion of catalyst was added when the temperature reached 180° C.

When the heating regimes were completed, the reactor was disassembled and the product PCCD was scooped out, cooled in cold water and analyzed. The results are given in Table I, in comparison to two controls in which temperatures outside the ranges of the invention were employed.

TABLE I

| Example | 1 | 2 | 3 | Control 1 | Control 2 |
|---|---|---|---|---|---|
| Molar ratio, DMCD/CHDM | 1.011 | 1.010 | 1.010 | 1.007 | 1.007 |
| Catalyst, μl: | | | | | |
| First portion | 100 | 50 | 50 | 300 | 300 |
| Second portion | — | 100 | 50 | — | — |
| Maximum temperature, ° C. | 253 | 253 | 253 | 265 | 245 |
| Product Mw | 79,700 | 80,900 | 70,700 | 58,000 | 54,500 |
| Product Tm | 234 | 227 | 229 | 230 | 234 |
| Product Tc | 183 | 177 | 184 | 165 | 172 |

It is not believed that the variations in molar ratio of DMCD to CHDM or catalyst amount have a significant effect on product properties. Thus, the results show the advantages of option I with regard to Mw and the parameter Tm−Tc, which is parallel to the property of rapid crystallization from the melt.

EXAMPLES 4–8 (Options I–II)

The procedure of Examples 1–3 was repeated, except that an aliphatic diol (EG—ethylene glycol, DEG—diethylene glycol, BD—1,4-butanediol) was incorporated in the initial reaction mixtures and the maximum temperature in each example was 253° C. The relevant parameters and results are given in Table II.

TABLE II

| Example | 4 | 5 | 6 | 7 | 8 |
|---|---|---|---|---|---|
| Molar ratio, DMCD/CHDM | 1.031 | 1.031 | 1.031 | 1.063 | 1.122 |
| Diol: | | | | | |
| Identity | BD | EG | DEG | DEG | DEG |
| Mole percent* | 5.0 | 5.0 | 5.0 | 9.7 | 19.5 |
| Catalyst, $\mu$l: | | | | | |
| First portion | 150 | 150 | 150 | 100 | 150 |
| Second portion | — | — | — | 100 | — |
| Product Mw | 81,800 | 92,900 | 76,600 | 76,400 | 91,600 |
| Product Tm | 222 | 223 | 225 | 222 | 212 |
| Product Tc | 157 | 150 | 161 | 149 | 141 |

*based on DMCD.

The product of each example was a polyester with a desirably high molecular weight.

EXAMPLES 9–11 (Options I–II)

The procedure of Examples 4–8 was repeated, with the addition to the original reaction mixture of 1 mole percent, based on DMCD, of hexamethylenebis(4-carbomethoxycyclohexylcarboxamide). The relevant parameters and results are given in Table III.

TABLE III

| Example | 9 | 10 | 11 |
|---|---|---|---|
| Molar ratio, DMCD/CHDM | 1.031 | 1.031 | 1.031 |
| Diol: | | | |
| Identity | BD | EG | DEG |
| Mole percent* | 5.1 | 5.0 | 5.0 |
| Catalyst, $\mu$l: | | | |
| First portion | 150 | 150 | 150 |
| Second portion | 150 | 150 | 150 |
| Product Mw | 76,600 | 85,900 | 78,500 |
| Product Tm | 220 | 222 | 222 |
| Product Tc | 166 | 163 | 165 |

*based on DMCD.

Again, the products had desirably high molecular weights.

What is claimed is:

1. A method for preparing a poly(1,4-cyclohexanedicarboxylate) by the reaction of at least one relatively non-volatile diol with a 1,4-cyclohexanedicarboxylic acid ester in the presence of a transesterification catalyst, said method employing at least one of the following options:

(I) conducting said reaction at a series of progressively increasing temperatures below 265° C., with a residence time in the range of 40–120 minutes at temperatures above 250° C.;

(II) conducting an initial stage of said reaction in the presence of at least one $C_{2-6}$ aliphatic diol in the amount of about 3–25 mole percent based on said 1,4-cyclohexanedicarboxylic acid ester.

2. The method according to claim 1 wherein the relatively non-volatile diol comprises 1,4-cyclohexanedimethanol.

3. The method according to claim 2 wherein the 1,4-cyclohexanedicarboxylic acid ester is a $C_{1-6}$ alkyl ester, an aromatic ester, or a substituted aromatic ester.

4. The method according to claim 3 wherein the catalyst comprises organometallic compounds containing at least one metal selected from the group consisting of titanium, zirconium, tin, germanium, gallium, zinc, iron, manganese, cobalt, hafnium, vanadium, iridium, lanthanum, cerium, lithium, calcium, magnesium, barium, nickel, and aluminum.

5. The method according to claim 1 wherein the relatively non-volatile diol is 1,4-cyclohexanedimethanol.

6. The method according to claim 5 wherein the 1,4-cyclohexanedicarboxylic acid ester is dimethyl 1,4-cyclohexanedicarboxylate.

7. The method according to claim 6 wherein the catalyst is a tetraalkyl titanate.

8. The method according to claim 4 comprising option I.

9. The method according to claim 1 further comprising at least one relatively non-volatile bis(hydroxy-terminated) polyether.

10. The method according to claim 9 further comprising at least one thermal stabilizer.

11. The method according to claim 1 further comprising at least one relatively non-volatile bis(amine-terminated) polyether.

12. The method according to claim 11 further comprising at least one thermal stabilizer.

13. The method according to claim 8 wherein the molar ratio of 1,4-cyclohexanedicarboxylic acid ester to relatively non-volatile diol or mixture of relatively non-volatile diols is in the range of about 1.001–1.010:1.

14. The method according to claim 8 wherein a residence time of the reaction mixture in the range of 80–120 minutes at temperatures above 250° C. is maintained.

15. The method according to claim 14 wherein the maximum temperature is 255° C.

16. The method according to claim 15 wherein the maximum temperature is 253° C.

17. The method according to claim 8 wherein the catalyst is introduced in stages.

18. The method according to claim 8 wherein a non-polyether-containing diamine or bisesteramide derived therefrom is also present.

19. The method according to claim 4 comprising option II.

20. The method according to claim 19 wherein the aliphatic diol has a boiling point at atmospheric pressure less than the boiling point at atmospheric pressure of the relatively non-volatile diol or mixture of relatively non-volatile diols.

21. The method according to claim 20 wherein the aliphatic diol is ethylene glycol, diethylene glycol or 1,4-butanediol.

22. The method according to claim 19 wherein the molar ratio of relatively non-volatile diol or mixture of relatively non-volatile diols to 1,4-cyclohexanedicarboxylic acid ester is in the range of about 1.025–1.15:1.

23. The method according to claim 19 wherein the catalyst is introduced in stages.

24. A method for preparing a poly(1,4-cyclohexane-dimethyl-1,4-cyclohexanedicarboxylate) by the reaction of 1,4-cyclohexanedimethanol with dimethyl 1,4-cyclohexanedicarboxylate in the presence of a titanate ester as transesterification catalyst, which comprises at least one of the following options:

(I) conducting said reaction at a series of progressively increasing temperatures below 255° C., with a residence time in the range of 40–120 minutes at temperatures above 250° C.;

(II) conducting an initial stage of said reaction in the presence of a diol selected from the group consisting of ethylene glycol, diethylene glycol or 1,4-butanediol, said diol being present in the amount of about 3–25 mole percent based on said dimethyl 1,4-cyclohexanedicarboxylate.

25. The method according to claim 24 comprising option I.

26. The method according to claim 25 wherein the molar ratio of dimethyl 1,4-cyclohexanedicarboxylate to 1,4-cyclohexanedimethanol is in the range of about 1.001–1.010:1.

27. The method according to claim 26 wherein the maximum temperature is 253° C.

28. The method according to claim 24 comprising option II.

29. The method according to claim 28 wherein the molar ratio of dimethyl 1,4-cyclohexanedicarboxylate to 1,4-cyclohexanedimethanol is in the range of about 1.025–1.15:1.

30. A poly(1,4-cyclohexanedicarboxylate) prepared according to the method of claim 8.

31. A poly(1,4-cyclohexanedicarboxylate) prepared according to the method of claim 19.

32. The poly(1,4-cyclohexanedicarboxylate) according to claim 31 which comprises 0.5–5 mole % diol units derived from $C_{2-6}$ aliphatic diol and 95–99.5 mole % diol units derived from the relatively non-volatile diol or mixture of relatively non-volatile diols.

33. The poly(1,4-cyclohexanedicarboxylate) according to claim 31 which consists essentially of diol units derived from the relatively non-volatile diol or mixture of relatively non-volatile diols.

34. A poly(1,4-cyclohexanedimethyl-1,4-cyclohexanedicarboxylate) prepared according to the method of claim 25.

35. A poly(1,4-cyclohexanedimethyl-1,4-cyclohexanedicarboxylate) prepared according to the method of claim 28.

36. The poly(1,4-cyclohexanedimethyl-1,4-cyclohexanedicarboxylate) according to claim 35 comprising 0.5–5 mole % diol units derived from ethylene glycol, diethylene glycol or 1,4-butanediol, and 95–99.5 mole % diol units derived from 1,4-cyclohexanedimethanol.

37. The poly(1,4-cyclohexanedimethyl-1,4-cyclohexanedicarboxylate) according to claim 35 consisting essentially of diol units derived from 1,4-cyclohexanedimethanol.

* * * * *